Patented Jan. 27, 1953

2,626,953

UNITED STATES PATENT OFFICE 2,626,953

POLYMERIC ORGANIC TIN COMPOUNDS

Gerry P. Mack, Jackson Heights, and Emery Parker, New York, N. Y., assignors to Advance Solvents and Chemical Corporation, New York, N. Y.

No Drawing. Application May 28, 1948,
Serial No. 29,935

18 Claims. (Cl. 260—429)

The invention relates to organo-tin compounds and to a process for preparing same.

Though an extremely large number of organo-tin compounds has been described in the chemical literature, little is known about polymeric organo-tin compounds. Very few higher condensation or polymerization products of organo-tin compounds have been synthesized and no practical use has been found for such compounds.

A principal object of this invention is to provide tin compounds which constitute a new and useful class of organic polymers.

Another object of the invention is to provide a convenient method for preparing the new organo-tin polymers.

Other objects and advantages will be apparent from a consideration of the specification and claims.

The new tin compounds acording to this invention are polymeric dialkyl or diaryl tin dialkoxides which may be regarded as ethers of a poly stannanediol or more exactly as diethers of a n-anhydro- $(n+1)$ dialkyl or diaryl stannanediol; they correspond to the general formula

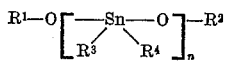

wherein $R^1$ and $R^2$ are alkyl, aralkyl or alicyclic groups attached to the terminal oxygen of the central tin chain through a carbon-oxygen linkage; $R^3$ and $R^4$ stand for an alkyl or aryl radical, and $n$ is a numeral higher than 1. $n$ is an integer in the case of pure polymers and a fraction in the case of mixtures of polymers. Such mixtures may contain lower polymers and the monomer or higher polymers having different degrees of polymerization.

The appearance of the new polymers depends to a certain extent on their degree of polymerization and on the length and nature of the alcohol radicals attached to the terminal oxygens. The lower polymers are at room temperature liquid, waxy or solid products; the higher polymers are mostly solids at room temperature except those having terminal long-chain alkyl groups, which may be liquid. All the polymers have a low vapor pressure and a good resistance against hydrolysis.

An interesting and valuable property of the new polymers is their solubility in a variety of organic solvents. This solubility facilitates their intimate mixing and compounding with other organic polymers, for instance with polyvinyl chlorides and polyvinyl chloride-copolymers or other halogen-containing resins, upon which small amounts of the tin polymers of this invention act as particularly efficient stabilizers producing clear, transparent, heat and light resistant plastic compositions.

The solubility of the lower polymers, especially the dimers and trimers, differs rather gradually from the solubility of the monomers; they are soluble at room temperature in alcohols, in aromatic hydrocarbons such as benzene, toluene, xylene, and also in halogenated aliphatic and aromatic hydrocarbons and ethers such as ethylene dichloride, carbon tetrachloride, dichloroethyl ether, benzene monochloride, and others.

The higher polymers containing up to 15 to 20 Sn atoms in a molecule are soluble in the same solvents at elevated temperatures in which the lower polymers are soluble at room temperature, with exception of the alcohols in which they are insoluble. This insolubility in alcohols allows their separation from the lower polymers and monomers, and using a fractionation technique it is possible to separate a range of polymers having different solubilities at various temperatures or in various solvents. The solubility of the higher polymers generally decreases with increasing degree of polymerization; on the other hand, the solubility of the polymers seems to increase with increasing molecular weight of the organic terminal groups. Therefore, when readily soluble high polymers shall be used, we prefer to employ such tin alkoxides wherein the terminal groups contain a carbon chain of at least 3 C atoms.

The organo-tin polymers according to this invention may be prepared by subjecting the monomeric compounds, as such or in solution, to polymerizing conditions, for instance by heating them at elevated temperatures. The following reaction takes place:

(1)

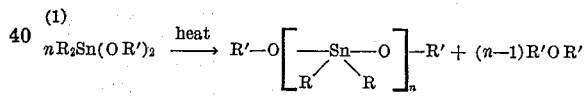

Generally, a mixture of condensation products will be obtained having a varying degree of polymerization, which may be controlled by adjusting the temperature, time of reaction, and other factors in accordance with the nature of the radicals constituting the organic components of the compound.

The rate of polymerization is, of course, primarily a function of the temperature, and the degree of polymerization a function of time and temperature. Too high temperatures should, however, be avoided because they favor the formation of very high less soluble or unsoluble polymerization products and lead finally to a decomposition into dialkyl or diaryl tin oxide and ether according to the equation (2) 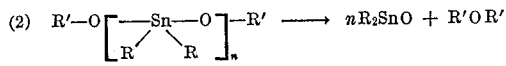 $\longrightarrow nR_2SnO + R'OR'$ Dialkyl and diaryl tin oxides are incompatible with polyvinyl chloride and similar resins and have to be removed before compounding said resins with the polymerized tin dialkoxides. The separation is easily achieved because dialkyl and diaryl tin oxide are insoluble in those solvents which dissolve the polymerized tin dialkoxides. By treating a mixture containing polymerized tin dialkoxides and dialkyl or diaryl tin oxide with any one of the solvents recited hereinbefore, the polymers are extracted and may be obtained in a substantially pure state by recrystallization or evaporation of the solvent.

In order to retard reaction (2) as far as possible we prefer to use temperatures below or at least not materially exceeding 100° C. A very convenient method consists in taking the solution of a monomer as starting material and in distilling off the solvent at an elevated temperature, which automatically leads to a polymerized end product. At a given temperature the degree of polymerization of the end product will depend on the length of time taken for the distillation; in other words, the degree of polymerization can be controlled by the quantity of solvent used and by the pressure under which the evaporation of the solvent is carried out. If only a dimerization or trimerization is desired we prefer to evaporate the solvent quickly under reduced pressure.

Though we have described hereinbefore the preparation of polymeric tin dialkoxides from the monomeric compounds we have found that it is not necessary to impart the polymerizing conditions to the isolated monomers but that it is sufficient to apply such conditions to reaction mixtures which contain the monomeric compound either in statu nascendi or already formed but without previously isolating said monomer.

Therefore, a very convenient way to prepare the polymeric compounds of this invention is to adopt, in principle, methods suitable to obtain the corresponding monomers and to subject the reaction mixtures to elevated temperatures during the course of the procedure, preferably towards the end or after the termination of the reaction proper.

As to the length and intensity of such a heat treatment, the same considerations apply as outlined hereinbefore with respect to the heat polymerization of the monomers. To avoid the formation of too highly condensed or polymerized compounds and decomposition to organo-tin oxides, we prefer to apply gentle heat over a limited period of time, for instance by allowing the temperature to rise slowly during the reaction or after the completion of the reaction between the halide and alcohol to 50°–150° C., preferably to 50–100° C. In many cases, the heat energy supplied for evaporating the solvent medium, in which the reaction has been carried out, is sufficient to effect the polymerization to the desired extent.

In accordance with this procedure, polymeric dialkyl, diaryl, or alkyl aryl tin dialkoxides are prepared directly from dialkyl, diaryl, or alkyl aryl tin dihalides by substituting therein for the halogen alkoxy radicals, for instance by allowing the halides to react first at low temperatures with alkali metal alkoxides in an anhydrous medium, thereby avoiding an excess of alcohol, or with an alcohol in the presence of ammonia or tertiary amines, and by heating them the reaction mixture or reaction product at an elevated temperature to bring about the polymerization.

As liquid medium in which the reaction is carried out, we use anhydrous organic solvents which do not cause side reactions in the presence of strong alkali as used in the process and which have a not too high boiling point in order to allow their ready removal by vaporization. Such inert solvents are for instance aromatic hydrocarbons such as benzene, toluene, xylene, or ethers, acetals and others.

In carrying out the reaction, care has to be taken to obtain end products which are free of tin halides because the halides are apt to catalyze the decomposition of vinyl-chloride resins into which the polymers may be incorporated.

Examples of dialkyl or diaryl tin halides which may be employed in making the tin dialkoxides include the following halides:

Dimethyl tin dichloride
Diethyl tin dichloride
Dibutyl tin dichloride
Diamyl tin dichloride
Dioctyl tin dichloride
Diphenyl tin dichloride
Dibenzyl tin dichloride
Ditolyl tin dichloride
Dixylyl tin dichloride
Dinaphthyl tin dichloride and others.

In the same way the corresponding dibromides may be used.

The reaction between the alkali alkoxide and the tin halide proceeds according to the following equation:

(3) 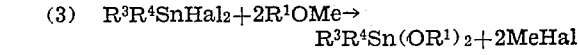
$R^3R^4Sn(OR^1)_2 + 2MeHal$ wherein Me stands for an alkali metal, $R^3$ and $R^4$ represent an alkyl or aryl group, and $R^1$ is an alkyl radical derived from an alcohol as defined hereinafter.

As alcohols we can use saturated or unsaturated primary, secondary or tertiary aliphatic or alicyclic alcohols such as methanol, ethanol, allyl alcohol, butanol, propanol, 2-ethyl hexanol, lauryl alcohol, methyl isobutyl carbinol, tertiary butyl alcohol, cyclohexanol, methyl cyclohexanol, dimethyl cyclohexanol, hydroabietyl alcohol, tetrahydrofurfuryl alcohol, and others. It is not necessary that the alkyl radicals derived from the alcohols consist only of hydrocarbon groups; they may contain, or the hydrocarbon chain may be interrupted by, oxygen or sulphur. Ether alcohols and thioether alcohols are examples of such compounds.

Also aromatic alcohols such as benzyl alcohol, phenyl ethyl alcohol, cinnamyl alcohol may be used provided they are true alcohols and not phenols.

The alkali metal alkoxides used in the process may be prepared by one of the following methods:

(a) By dissolving metallic sodium or potassium in the respective alcohol and by distilling off the excess of said alcohol azeotropically or preferably under reduced pressure;

(b) By the metathetical reaction between a higher alcohol and sodium methoxide and distilling out the methonal;

(c) By dissolving solid sodium or potassium hydroxide in the respective alcohol and distilling out azeotropically the water of reaction.

Another method for the preparation of the tin dialkoxides consists in allowing dialkyl or diaryl tin dihalides to react under anhydrous conditions with a substantially stoichiometric amount of the respective anhydrous alcohol in the presence of tertiary amines such as trimethylamine, triethylamine, tributylamine, dimethylaniline, pyridine, N-methylmorpholine and others. In this case, the reaction can be represented by the following equation:

(4) $R_2SnHal_2 + 2NR'_3 + 2R^2OH \rightarrow R_2Sn(OR^2)_2 + 2R'_3NHHal$

The same result can be achieved by using ammonia gas under anhydrous conditions; the reactions involved are then:

(5) $R_2SNHal_2 + 2NH_3 \rightarrow R_2Sn(NH_3Hal)_2$ (6) $R_2Sn(NH_3Hal)_2 + 2R^1OH \rightarrow R_2Sn(OR^1)_2 + 2NH_4Hal$ In the last two cases the tertiary amine hydrohalide or ammonium halide must be separated from the reaction products; in the case of the tertiary amine reaction, the rather expensive amine will be recycled for use in the production of additional quantities of tin alkoxides.

Moisture and an excess of alcohol must be avoided because the presence of hydroxyl groups favors the formation of very high polymers and insoluble tin oxides according to Equation 2.

The preparation of the polymeric tin dialkoxides according to the invention is illustrated but not limited by the following examples.

Example 1

60.8 grams of dibutyl tin dichloride were dissolved in 200 cc. of toluene and 21.6 grams of sodium methoxide were gradually added thereto with stirring. The temperature of the charge was kept by cooling at about 0° C. The charge was heated at a temperature of about 80° C. for ten minutes and then the reaction product was filtered hot from the precipitated sodium chloride and the solvent was distilled off from the clear filtrate under reduced pressure at 80° C. A colorless oil was obtained which solidified on standing. The yield of dibutyl tin dimethoxide was in excess of 95 per cent of theory on the basis of the dibutyl tin dichloride.

When purified by recrystallization from hot ethanol or toluene, the obtained product had a melting point of 118° to 119° C. Its average molecular weight was 397.6 and it represented a dibutyl tin dimethoxide of the formula $$CH_3O\left[-Sn-O-\atop{C_4H_9\phantom{xx}C_4H_9}\right]_{1.4}CH_3$$

wherein the numeral 1.4 designates the average degree of polymerization.

This product was further polymerized by heating at temperatures of 100 and 150° C., whereby the following polymerization products were obtained ($n$=degree of polymerization).

The degree of polymerization was determined by dissolving samples of the products in hot toluene, filtering off the insoluble matter, removing the solvent at a pressure of 2 to 5 mm. as quickly as possible to avoid further polymerization, and analyzing the obtained product. At 150° C. an increasing amount of toluene-insoluble matter—presumably dibutyl tin oxide and/or very high molecular weight insoluble polymers—was obtained.

Example 2

4.6 grams of metallic sodium were dissolved in n-propyl alcohol and the excess of the propyl alcohol was distilled off under reduced pressure. Sodium propoxide was obtained which was slurried into 100 cc. of toluene cooled to 0° C. and a solution of 33.2 grams of di n-amyl tin dichloride in 50 cc. of toluene was added thereto. At the end of the procedure, recognized by the neutral reaction of the mixture, the precipitated sodium chloride was filtered off and the solvent was evaporated under a pressure of 10 mm. at 80° C. within one hour. After removing monomeric di n-amyl tin dipropoxide by washing with cold ethanol the residue was dissolved in hot toluene from which it separated on cooling.

The toluene soluble end product was a polymeric di n-amyl tin dipropoxide of the formula $$CH_3CH_2CH_2-O\left(-Sn-O-\atop{C_5H_{11}\phantom{xx}C_5H_{11}}\right)_{7.5}CH_2CH_2CH_3$$

wherein the numeral 7.5 represents the average value of the various polymers constituting the total toluene soluble fraction.

Example 3

According to the procedure outline in the preceding examples, 18.5 grams of sodium butoxide were prepared by dissolving metallic sodium in n-butyl alcohol. The sodium butoxide was suspended in toluene and allowed to react with 30.4 grams of dibutyl tin dichloride at 0° to 5° C. under cooling until the reaction mixture was neutral. The precipitated sodium chloride was filtered off and the solvent was then removed by distillation at 100° C. within 90 minutes at 10 mm. pressure.

The residue was purified by washing with ethyl alcohol. Two products were obtained: monomer dibutyl tin dibutoxide in the form of a viscous liquid, and a solid product completely soluble in hot toluene. This solid product had an average molecular weight of 2784 and the structural formula $$C_4H_9-O\left[-Sn-O\atop{C_4H_9\phantom{xx}C_4H_9}\right]_{10.66}-C_4H_9$$

wherein 10.66 represents again the average degree of polymerization.

The liquid monomeric dibutyl tin dibutoxide obtained by the extraction with ethanol was polymerized by heating at temperatures of 100 and 150° C., as described in Example 1 for the polymerization of the dibutyl tin dimethoxide.

| Heating Time | Temperatures | |
|---|---|---|
| | 100° C. $n$ | 150° C. $n$ |
| 15 min | 1.95 | 3.08 |
| 30 min | 2.88 | 6.8 |
| 45 min | 4.20 | 9.15 |
| 60 min | 6.4 | |

| Heating Time | Temperatures | |
|---|---|---|
| | 100° C. $n$ | 150° C. $n$ |
| 15 min | 1.7 | 3.22 |
| 30 min | 3.0 | 6.25 |
| 45 min | 4.51 | 9.9 |
| 60 min | 5.95 | 11.8 |

Example 4

29.1 grams of sodium 2-ethyl hexoxide were prepared by dissolving metallic sodium in 2-ethyl hexanol. Sodium 2-ethyl hexoxide was obtained and dispersed in a dry alcohol-free state in toluene and allowed to react with 30.4 grams of dibutyl tin dichloride at a temperature of 0° to 5° C. At the end of the reaction the precipitated sodium chloride was filtered off and the solvent removed by distillation under pressure of 5 mm. at 100° C. within 30 minutes. The end product was treated with ethyl alcohol and the residue recrystallized from hot toluene.

In this way a liquid and a solid end product were obtained. The solid toluene-soluble fraction had a molecular weight of 845 and the structural formula

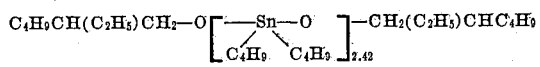

the numeral 2.42 representing the average degree of polymerization of the compound.

The liquid ethanol-soluble fraction was monomeric dibutyl tin di-2-ethylhexoxide, which could be further polymerized by heating at 100 and 150° C., as described in Example 1 for the polymerization of the dibutyl tin dimethoxide.

| Heating Time | Temperatures | |
| --- | --- | --- |
| | 100° C. $n$ | 150° C. $n$ |
| 15 min | 1.5 | 2.42 |
| 30 min | 2.05 | 3.64 |
| 45 min | 2.85 | 7.2 |
| 60 min | 3.30 | 9.4 |

Example 5

5.5 grams of sodium methoxide were dispersed in 50 cc. of toluene and 17.5 grams of diphenyl tin dichloride dissolved in toluene were added thereto at a temperature of 0° C. The reaction was brought to completion at a temperature of 20° C. and the precipitated sodium chloride was filtered off. After distilling off the solvent at 80° C. under a pressure of 10 mm. within twenty minutes, a waxy product was obtained, having a molecular weight of 485.7 and being a polymer diphenyl tin dimethoxide of the formula

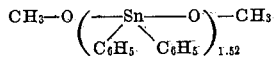

wherein 1.52 designates the average degree of polymerization. The product may be presumed to be a mixture of the monomer and dimer.

Example 6

30.4 grams of dibutyl tin dichloride were dissolved in 50 cc. of toluene, and dry ammonia gas was introduced into the solution until saturation was obtained. Then 6.4 grams of methyl alcohol were added thereto and the mixture was heated to a temperature of 60 to 65° C. until no more ammonia was given off. The precipitated ammonium chloride was filtered off and the solvent was evaporated under reduced pressure at 80° C. The product thus obtained had an average molecular weight of 583.6 and was a polymerized dibutyl tin dimethoxide having an average degree of polymerization of 2.16.

Example 7

12.4 grams of diethyl tin dichloride, 8.3 grams of pyridine and 13.1 grams of 2-ethylhexanol were mixed and heated for two hours at 100 to 120° C. The reaction product was first washed with cold water and then with methyl alcohol. The solid residue had an average molecular weight of 2943. Its composition corresponded to a polymerized diethyl tin di-2-ethylhexoxide with an average polymerization degree of 11.7.

Example 8

8.2 grams of sodium hydroxide flakes, 23.6 grams of butoxyethyleneglycol and 100 cc. of xylene were refluxed at 140 to 145° C. until the water was completely driven off. Sodium butoxyethyleneglycoxide was formed to which were added at room temperature 30.4 grams of dibutyl tin dichloride dissolved in xylene. The reaction was completed at 50° C. whereupon the precipitated sodium chloride was filtered off and the solvent quickly evaporated under reduced pressure at 150° C. After washing with alcohol the residue was dissolved in hot toluene. The solidified end product had an average molecular weight of 3027. Its composition was represented by the structural formula

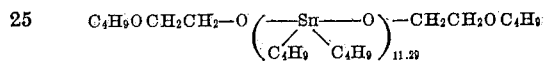

wherein 11.29 designates the average degree of polymerization.

Example 9

17.9 grams of sodium benzoxide, prepared by dissolving metallic sodium in benzyl alcohol, were slurried into 300 cc. of toluene cooled to 0° C., and then 20.5 grams of dibutyl tin dichloride dissolved in 50 cc. of toluene were added thereto. After the reaction mixture had become neutral the toluene was distilled off under reduced pressure at 80° C. The residue was subjected to a heat treatment at 100° C. for an hour at a pressure of 5 mm. to remove the volatile reaction products. Monomeric dibutyl tin dibenzoxide was removed by washing with ethanol at room temperature. The residue, soluble in hot toluene, had a molecular weight of 1898 corresponding to a compound having the following formula

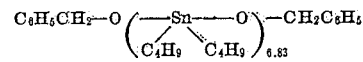

wherein the numeral 6.83 designates the average degree of polymerization.

Example 10

4.6 grams of metallic sodium were dissolved under cooling in an excess of allyl alcohol and the excess allyl alcohol was then distilled off under reduced pressure. The thus obtained sodium allylate was slurried into 100 cc. of toluene, cooled to 0° C., and 30.4 grams of dibutyl tin dichloride dissolved in 50 cc. of toluene were added thereto under cooling at 0° to 5° C. The mixture was shaken until the reaction was neutral; then the precipitated sodium chloride was filtered off and the solvent removed at 10 mm. pressure at 80° C. A viscous, oily product was obtained; it had an average molecular weight of 667.8 and corresponded to the formula

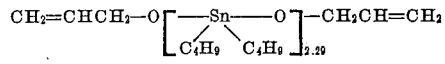

wherein the numeral 2.29 designates the degree of polymerization.

Example 11

24.4 grams of sodium cyclohexoxide, prepared in a well known manner from metallic sodium and cyclohexanol, were suspended in toluene and allowed to react with 30.4 grams of dibutyl tin dichloride dissolved in toluene. The reaction was carried out under cooling at 0° to 5° C., the precipitated sodium chloride was filtered off and the solvent was removed at 80° C. under 10 mm. pressure. The remaining liquid was purified by alcohol extraction. The residue was a polymeric dibutyl tin dicyclohexoxide having an average molecular weight of 2358 and the formula

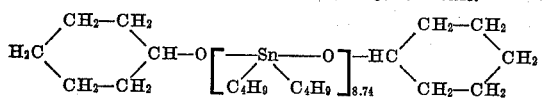

wherein the numeral 8.74 designates the average degree of polymerization.

In the specification and the claims, the term "alkoxide" is understood to embrace derivatives of saturated or unsaturated aliphatic alcohols, of ether and thioether alcohols, and of alicyclic and aralkyl alcohols wherein a H atom of the alcoholic hydroxyl groups has been replaced by a metal or organotin complex. In the latter case, members of the ring or H atoms attached thereto may be substituted by other elements or groups which do not produce side reactions with the tin halide.

Resins stabilized with polymeric dialkyl or diaryl tin dialkoxides of this invention are claimed in our co-pending application, Serial No. 57,425.

Various modifications in the composition and in the preparation of the organo-tin compounds will be apparent to those skilled in the art and such modifications are included in the scope of the invention as defined by the appended claims.

What we claim is:

1. Polymeric organo-tin compounds having the formula

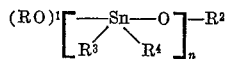

wherein $(RO)^1$ is the residue of an alcohol, $R^2$ is the same organic group as R in said $(RO)^1$, $R^3$ and $R^4$ stand for a member of the group consisting of alkyl and aryl, and where $n$ is a numeral higher than 1.

2. Polymeric organo-tin compounds as claimed in claim 1, wherein the degree of polymerization $n$ is not higher than 20.

3. Polymeric organo-tin compounds as claimed in claim 1, wherein the terminal groups $(RO)^1$ and $R^2$ contain at least one unsaturated carbon-to-carbon linkage.

4. As a new group of chemical compounds, polymeric dialkyl tin dialkoxides of the formula $(RO)' \cdot (R_2'SnO)_n \cdot R^2$ wherein $(RO)'$ is the residue of an alcohol, $R^2$ is the same organic group as R in said $(RO)'$, $R'$ is alkyl, and where $n$ is a numeral higher than 1.

5. Polymeric dialkyl tin dialkoxides as defined in claim 4 wherein $(RO)'$ is the residue of an aliphatic alcohol.

6. Polymeric dialkyl tin dialkoxides as defined in claim 4 wherein $(RO)'$ is the residue of an aromatic alcohol.

7. As a new group of chemical compounds, polymeric diaryl tin dialkoxides of the formula $(RO)' \cdot (R_2'SnO)_n \cdot R^2$ wherein $(RO)'$ is the residue of an alcohol, $R^2$ is the same organic group as R in said $(RO)'$, $R'$ is aryl, and where $n$ is a numeral higher than 1.

8. Polymeric diaryl tin dialkoxides as defined in claim 7 wherein $(RO)'$ is the residue of an aliphatic alcohol.

9. Polymeric diaryl tin dialkoxides as defined in claim 7 wherein $(RO)'$ is the residue of an aromatic alcohol.

10. Polymeric dialkyl tin dimethoxides of the general formula

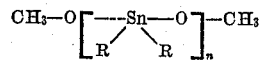

wherein R is alkyl and $n$ a numeral higher than 1.

11. Polymeric dialkyl tin dibutoxides of the general formula

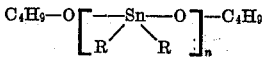

wherein R is alkyl and $n$ a numeral higher than 1.

12. Polymeric dialkyl tin dialkoxides of the general formula

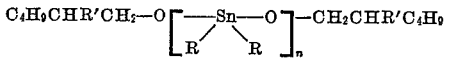

wherein R is alkyl, R' is a member of the group consisting of hydrogen and alkyl, and where $n$ is a numeral higher than 1.

13. A process for preparing polymeric tin dialkoxides comprising the steps of causing an organo-tin dihalide selected from the group consisting of dialkyl, diaryl, and alkyl aryl tin dihalides to react in an anhydrous organic solvent free of alcoholic hydroxyl groups with the substantially stoichiometric amount of an alcohol in the presence of a base forming an insoluble halide in said solvent, removing said precipitated halide and the solvent, and heating at least temporarily during the course of the procedure at a temperature not exceeding 150° C.

14. A process as claimed in claim 13 wherein the end product is washed with a lower aliphatic alcohol to remove monomeric reaction products.

15. A process for preparing polymeric tin dialkoxides comprising the steps of causing an organo-tin dihalide selected from the group consisting of dialkyl, diaryl, and alkyl aryl tin dihalides to react in an anhydrous organic solvent free of alcoholic hydroxyl groups with the substantially stoichiometric amount of an alcohol in the presence of a base forming an insoluble halide in said solvent, removing said precipitated halide, and distilling off said solvent at a temperature between 50 and 150° C.

16. A process for preparing polymeric tin dialkoxides comprising the steps of causing an organo-tin dihalide selected from the group consisting of dialkyl, diaryl, and alkyl aryl tin dihalides to react in an anhydrous organic solvent free of alcoholic hydroxyl groups with the substantially stoichiometric amount of an alkali metal alkoxide, removing the precipitated alkali halide and the solvent, and heating at least temporarily during the course of the procedure at a temperature not exceeding 150° C.

17. A process for preparing polymeric tin dialkoxides comprising the steps of causing one mole of an organo-tin dihalide selected from the group consisting of dialkyl, diaryl, and alkyl aryl tin dihalides to react in an anhydrous organic solvent free of alcoholic hydroxyl groups with about two moles of an alcohol and with ammonia, removing the precipitated ammonium halide and the solvent, and heating at least temporarily during the course of the procedure at a temperature not exceeding 150° C.

18. A process for preparing polymeric tin dialkoxides comprising the steps of causing one mole of an organo-tin dihalide selected from the group consisting of dialkyl, diaryl, and alkyl aryl tin dihalides to react in an anhydrous organic solvent free of alcoholic hydroxyl groups with about two moles of an alcohol in the presence of a tertiary amine, removing the precipitated halide and the solvent, and heating at least temporarily during the course of the procedure at a temperature not exceeding 150° C.

GERRY P. MACK.
EMERY PARKER.

REFERENCES CITED

The following references are of record in the file of this patent:

UNITED STATES PATENTS

| Number | Name | Date |
|---|---|---|
| 2,267,777 | Yngve | Dec. 30, 1941 |
| 2,481,086 | Cleverdon | Sept. 6, 1949 |

OTHER REFERENCES

Aronheim: Annalen der Chemie, vol. 194 (1878), pp. 168–170.

Harada: Science Papers of the Institute of Physical and Chemical Research (Tokyo), vol. 35 (1939), pp. 318–328.